(12) United States Patent
Ushiroda

(10) Patent No.: US 6,970,270 B1
(45) Date of Patent: Nov. 29, 2005

(54) IMAGE PROCESSING APPARATUS AND METHOD FOR CORRECTING PRINT DATA SO AS TO REDUCE DENSITY UNEVENNESS, AND IMAGE FORMING SYSTEM

(75) Inventor: Atsushi Ushiroda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 758 days.

(21) Appl. No.: 09/690,089

(22) Filed: Oct. 17, 2000

(30) Foreign Application Priority Data

Oct. 20, 1999 (JP) ............................... 11-298657

(51) Int. Cl.[7] ..................... G06K 15/00; H04N 1/405
(52) U.S. Cl. .................... 358/1.9; 358/3.06; 358/3.13; 358/3.22
(58) Field of Search ............................... 358/1.9, 2.99, 358/3.01, 3.06, 3.13, 3.14, 3.21, 3.22, 406, 358/504, 534, 535, 536

(56) References Cited

U.S. PATENT DOCUMENTS 5,528,270 A    6/1996   Tajika et al. .................. 347/19
5,832,122 A *  11/1998  Shimazaki ................... 382/237
5,854,882 A *  12/1998  Wang .......................... 358/1.9
6,515,770 B1 * 2/2003   Rao et al. .................. 358/3.13

FOREIGN PATENT DOCUMENTS

JP            5-69545         3/1993

* cited by examiner

Primary Examiner—Thomas D. Lee
(74) Attorney, Agent, or Firm—Fitzpatrick, Cella, Harper & Scinto

(57) ABSTRACT

Disclosed are an image processing apparatus and method in which it is possible to suppress density unevenness in the output of an image forming apparatus in a simple manner. A test image is printed out by a printer (13), the printout is read by an image reading processing unit (10), and an analyzing processing unit (17) detects the output characteristic (density unevenness, printing position deviation, etc.) of each of a plurality of print elements possessed by the printhead of the printer. A mask generating processing unit (11) generates a threshold-value mask which reflects the output characteristics detected by the analyzing processing unit and stores the mask in a mask memory (15). A halftoning processing unit (12) outputs image data to the printer after the image data is subjected to halftoning utilizing the threshold-value map that has been stored in the mask memory.

11 Claims, 13 Drawing Sheets

111  112  113  114

IMAGE PROCESSING APPARATUS AND METHOD FOR CORRECTING PRINT DATA SO AS TO REDUCE DENSITY UNEVENNESS, AND IMAGE FORMING SYSTEM

FIELD OF THE INVENTION

This invention relates to an image processing apparatus and method. More particularly, the invention relates to an image processing apparatus and method having a mechanism for correcting output data so as to reduce density unevenness in an output generated by an image forming apparatus such as a printer.

BACKGROUND OF THE INVENTION

Conventional devices for forming an image on a recording medium such as paper or an OHP sheet have been proposed in a form having a mounted printhead that operates based on various printing techniques. Examples of these printing techniques are the wire dot, thermosensitive, thermal transfer and ink-jet techniques. All of these techniques generally employ a printhead in which a plurality of print elements are integrated in order to raise printing efficiency.

In an arrangement of this type, it is difficult to avoid band-like density unevenness caused by variations in the spacing between the print elements and by the mechanical precision with which the printhead and print medium are moved. More specifically, with the ink-jet technique, minute stripes are produced by slight differences in ink discharge direction and quantity from one ink discharge nozzle, i.e., print element, to the next, and band-like density unevenness is produced at intervals equivalent to the amount of movement of the print medium owing to errors in nozzle spacing and in the amount of movement of the print medium.

A head shading correction such as disclosed in the specification of Japanese Patent Application Laid-Open No. 5-069545 has been used as a method of correcting such density unevenness. In brief, this method involves outputting a test chart by an image forming apparatus, reading the characteristic of unevenness contained in the results output by an image reading unit such as a scanner, correcting the image data so as to cancel out this unevenness, and supplying the corrected data to the image forming apparatus.

However, when use is made of a method of correcting density unevenness using the head shading correction, the number of tone levels of the input image is reduced by the correction and output time is prolonged.

SUMMARY OF THE INVENTION

Accordingly, an object of the present invention is to provide an image processing apparatus and method in which it is possible to suppress density unevenness in the output of an image forming apparatus in a simple manner.

According to one aspect of the present invention, the foregoing object is attained by providing an image processing apparatus for supplying an image forming apparatus with image data that has been performed halftoning process by using a threshold mask which is corrected based on an output characteristic of the image forming apparatus, comprising: output characteristic detection means for detecting the output characteristic from results output by the image forming apparatus; mask generating means for generating the threshold mask, which is used in the halftoning process, by correcting a threshold mask based upon the output characteristic detected; supplying means for subjecting image data output to the image forming apparatus to the halftoning processing using the generated threshold mask, and supplying the image forming apparatus with the image data after the halftoning process thereof; and
wherein the mask generating means generates the threshold mask by using potential weighted by the output characteristic detected by the output characteristic detection means.

According to another aspect of the present invention, there is provided an image forming system comprising the image forming apparatus of the present invention and an image forming apparatus.

According to another aspect of the present invention, the foregoing object is attained by providing an image processing method for supplying an image forming apparatus with image data that has been performed halftoning process by using a threshold mask which is corrected based on an output characteristic of the image forming apparatus, comprising: an output characteristic detection step for detecting the output characteristic from results output by the image forming apparatus; a mask generating step for generating the threshold mask, which is used in the halftoning process, by correcting a threshold mask based upon the output characteristic detected; a supplying step for subjecting image data output to the image forming apparatus to the halftoning processing using the generated threshold mask, and supplying the image forming apparatus with the image data after the halftoning process thereof; and wherein the mask generating step generating the threshold mask by using potential weighted by the output characteristic detected by the output characteristic detection step.

According to another aspect of the present invention, there is provided a storage medium storing a program capable of being executed by a computer, wherein the computer which executes the program is made to function as the image processing apparatus of the present invention.

According to another aspect of the present invention, there is provided a storage medium storing the image processing method of the present invention as a program capable of being executed by a computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

First Embodiment (Overall Construction)

Figure 1:
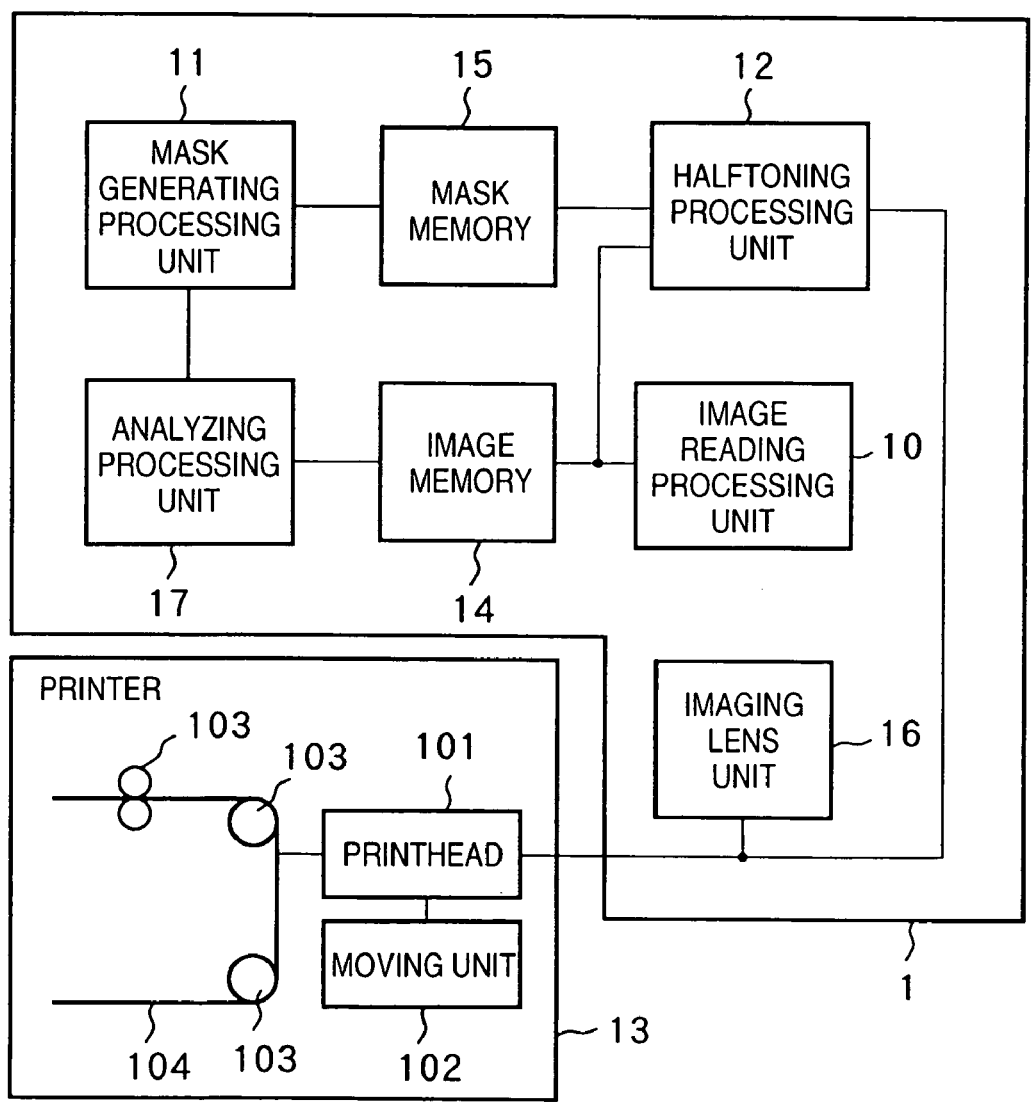
FIG. 1 is a block diagram illustrating an image processing apparatus according to a first embodiment of the present invention.

FIG. 1 is a block diagram illustrating an example of the configuration of an image forming system obtained by connecting an image processing apparatus 1 according to this embodiment of the invention and a printer 13 serving as an image forming apparatus.

The image processing apparatus 1 and printer 13 are connected by a printer interface or network interface, neither of which are shown.

As shown in FIG. 1, the image processing apparatus 1 includes an image reading processing unit 10 for reading output image; a mask generating processing unit 11 for generating a threshold-value mask; a halftoning processing unit 12 for halftoning an input image; an image memory 14 for storing as input image and a read image; a mask memory 15 for storing the threshold-value mask; a test image memory 16 for storing a test image that is for measuring the characteristic of the output device; and an analyzing processing unit 17 for analyzing the characteristic of the output device based upon a read image.

The printer 13 includes a printhead 101 moved vertically and horizontally relative to a print medium 104 to thereby form an image on the print medium. The printhead 101 used can employ any printing technique, such as the wire dot, thermosensitive, thermal transfer and ink-jet techniques and has more than one print element regardless of the technique. The printer 13 further includes a moving unit 102 for moving the printhead 101 and transport means 103 for transporting the print medium. In a printer of this kind, it is difficult to avoid band-like density unevenness being produced in an image by variations in the disposition and characteristics of the print elements constructing the printhead 101 and by the mechanical precision of the moving unit 102 and transport means 103.

(Image Formation Processing)

Figure 2:
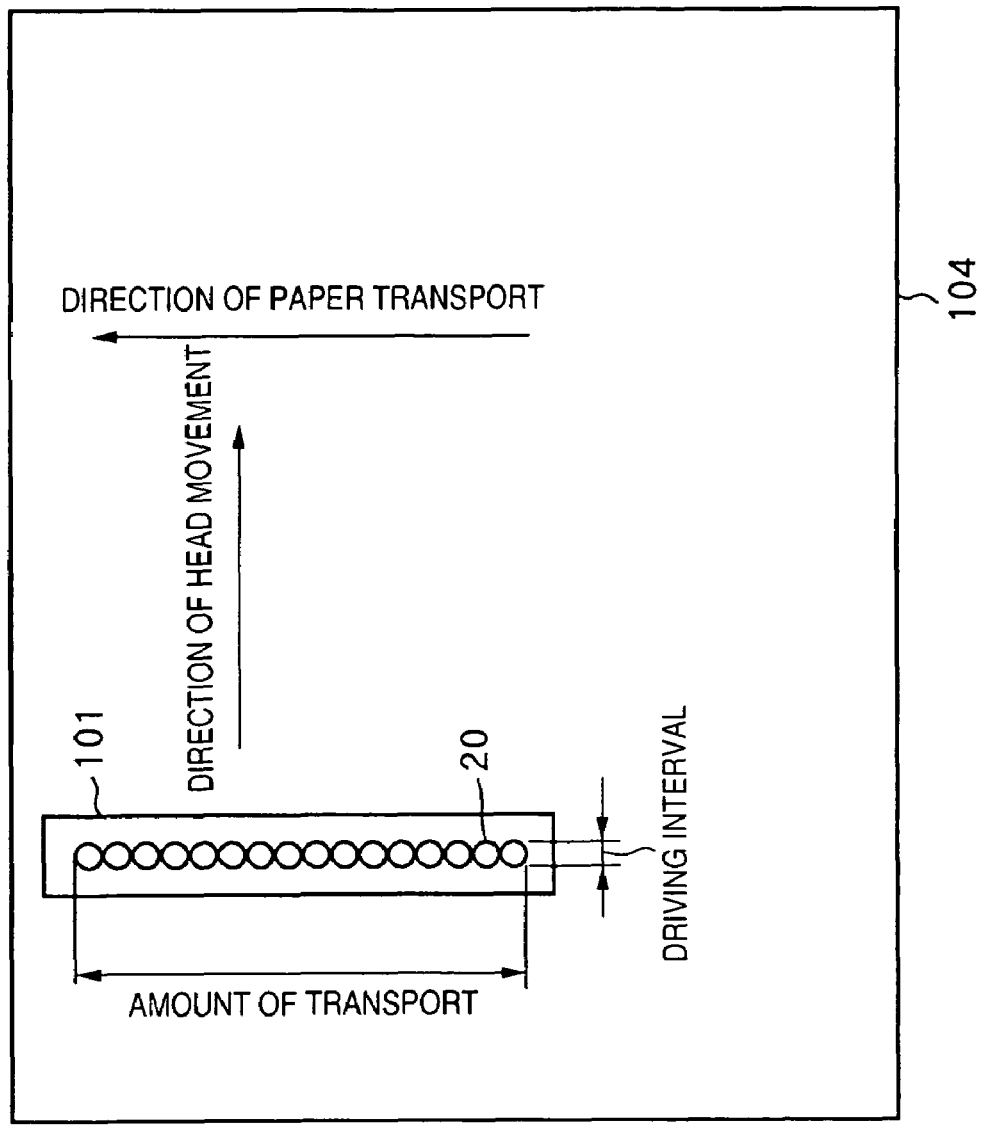
FIG. 2 is a diagram showing the structure of a printhead.

FIG. 2 is a diagram showing the construction of the printhead 101. To simplify the description, FIG. 2 illustrates a printhead so constructed that the print elements are arrayed in a single row in the direction in which the paper (the print medium) is transported. However, the print elements may be of any number and may be arranged in any manner. For example, the print elements may be arranged in a plurality of rows or in zigzag fashion.

As shown in FIG. 2, 16 print elements 20 are arranged vertically at fixed intervals. While the printhead 101 is moved from left to right relative to the print medium 104, the print elements are driven at fixed driving intervals to print an image on the print medium 104. When one scan ends, the printhead 101 is returned to the left side and the print medium 104 is transported a fixed amount at the same time. An image is recorded by repeating the processing described above.

(Image Correction Processing)

Processing for correcting and outputting an image by this image processing apparatus will now be described.

Figure 3:
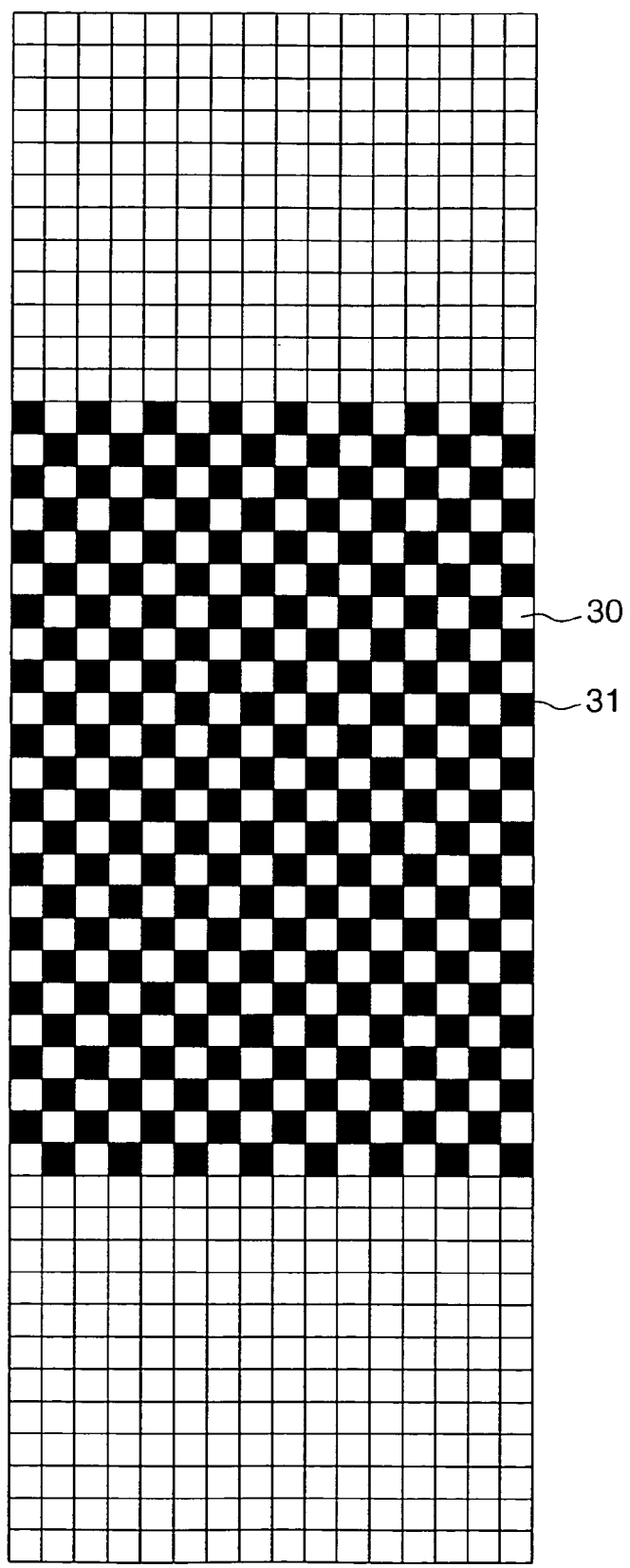
FIG. 3 is a diagram showing an example of a test chart.

First, a test image is output in order to measure the characteristics of the output device. FIG. 3 illustrates the details of the test image. Each square in FIG. 3 represents one pixel of the image, a white square 30 indicates that the pixel is not printed, and a black square 31 indicates that the pixel is printed. The size of the image is 16 pixels horizontally and 48 pixels vertically, and the test image is printed on the print medium by scanning the printhead of FIG. 2 three times.

Figure 4:
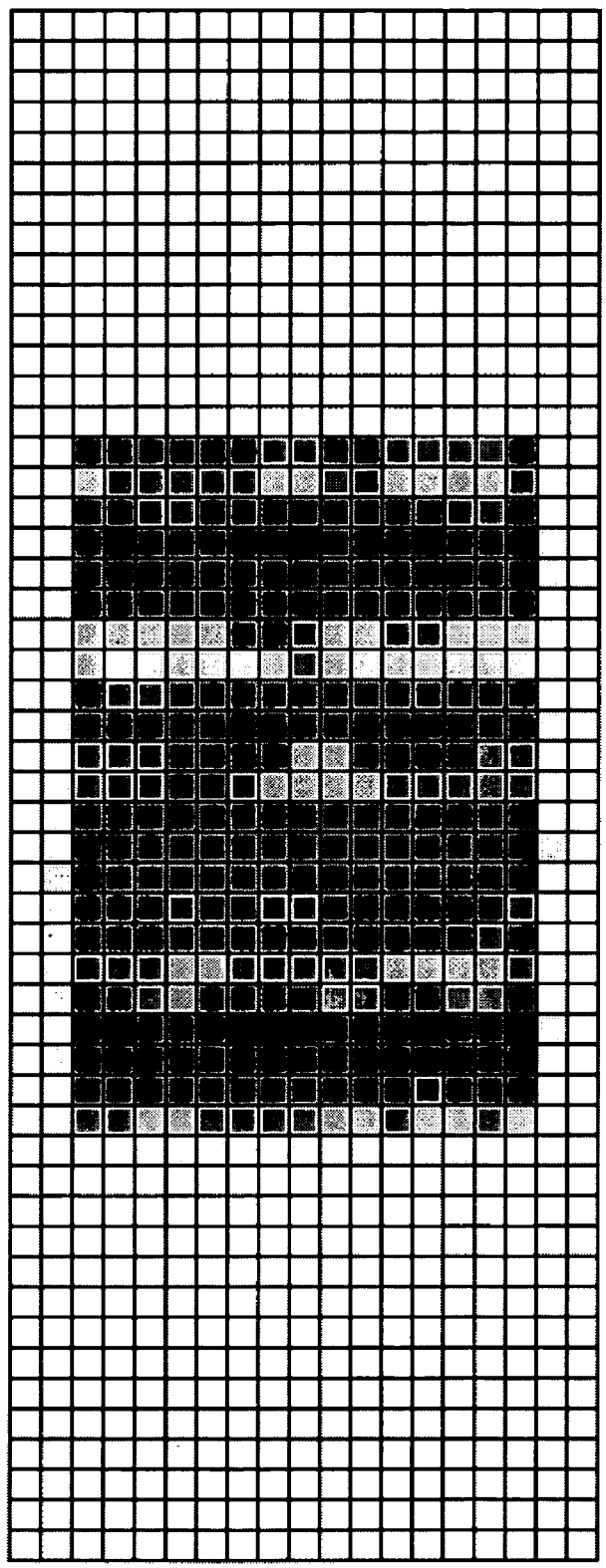
FIG. 4 is a diagram showing an example of result of reading the test chart.

Next, the result of outputting the test image is read by the image reading processing unit 10. In this embodiment, the reading resolution of the image reading processing unit 10 is assumed to be the same as the output resolution of the printer 13 and it is assumed that 256 levels can be read for each pixel. FIG. 4 illustrates an example of the image read by the image reading processing unit 10.

Figure 5:
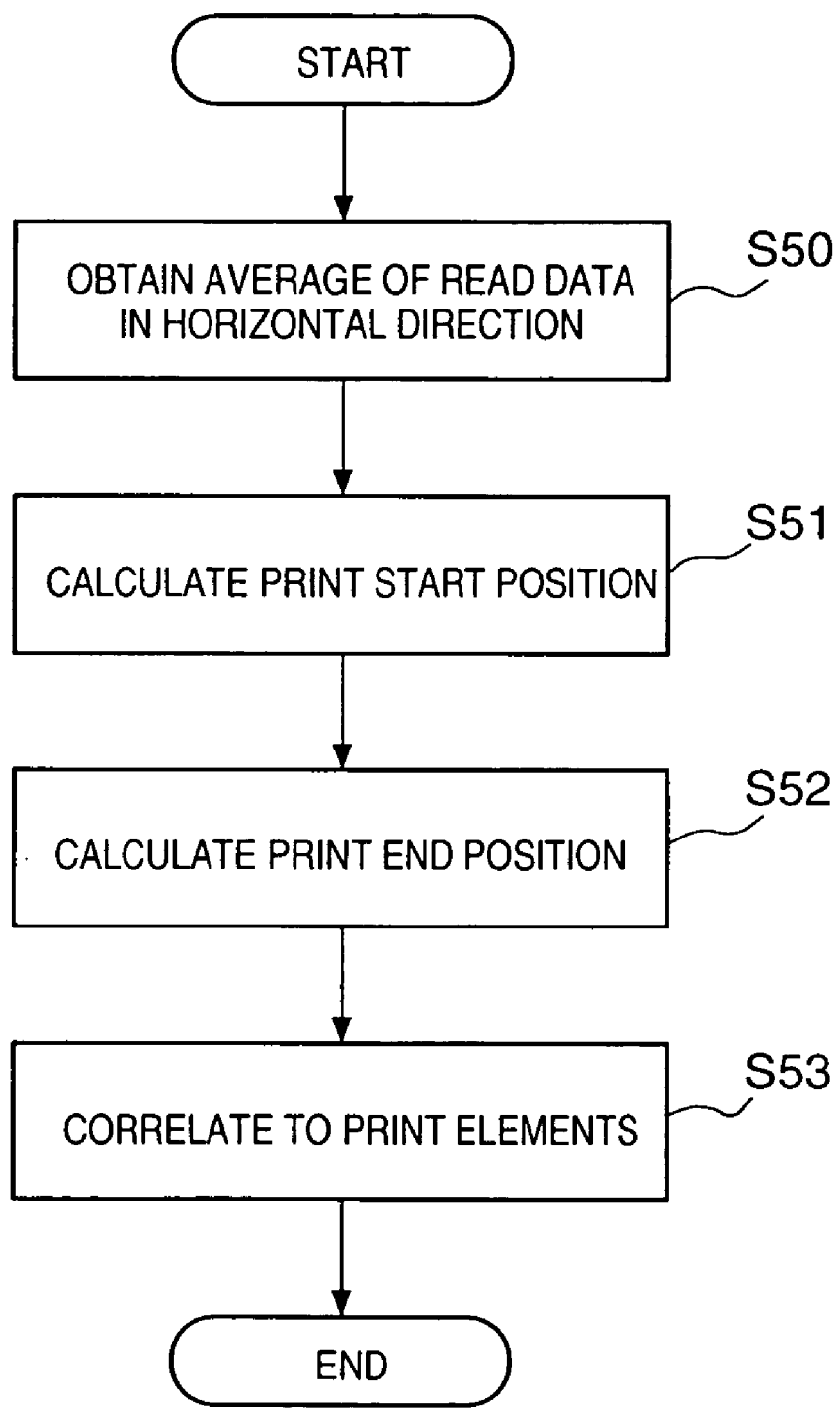
FIG. 5 is a flowchart illustrating the operation of an analyzing processor.

Next, the output characteristic of each print element is analyzed by the analyzing processing unit 17. FIG. 5 is a flowchart illustrating processing executed by the analyzing processing unit 17.

As shown in FIG. 5, the analyzing processing unit 17 first obtains the average of the read image data in the horizontal direction (step S50). Letting I(x,y) represent the value of a pixel read at a position (x,y), where the upper left of the read image is assumed to be the origin, the average value A(y) of a line y is obtained in accordance with the following equation:

$$A(y) = \sum_{i=0}^{W-1} I(i, y) / W$$

where W represents the number of pixels (19 in this embodiment) in the horizontal direction of the read image.

Figure 6:
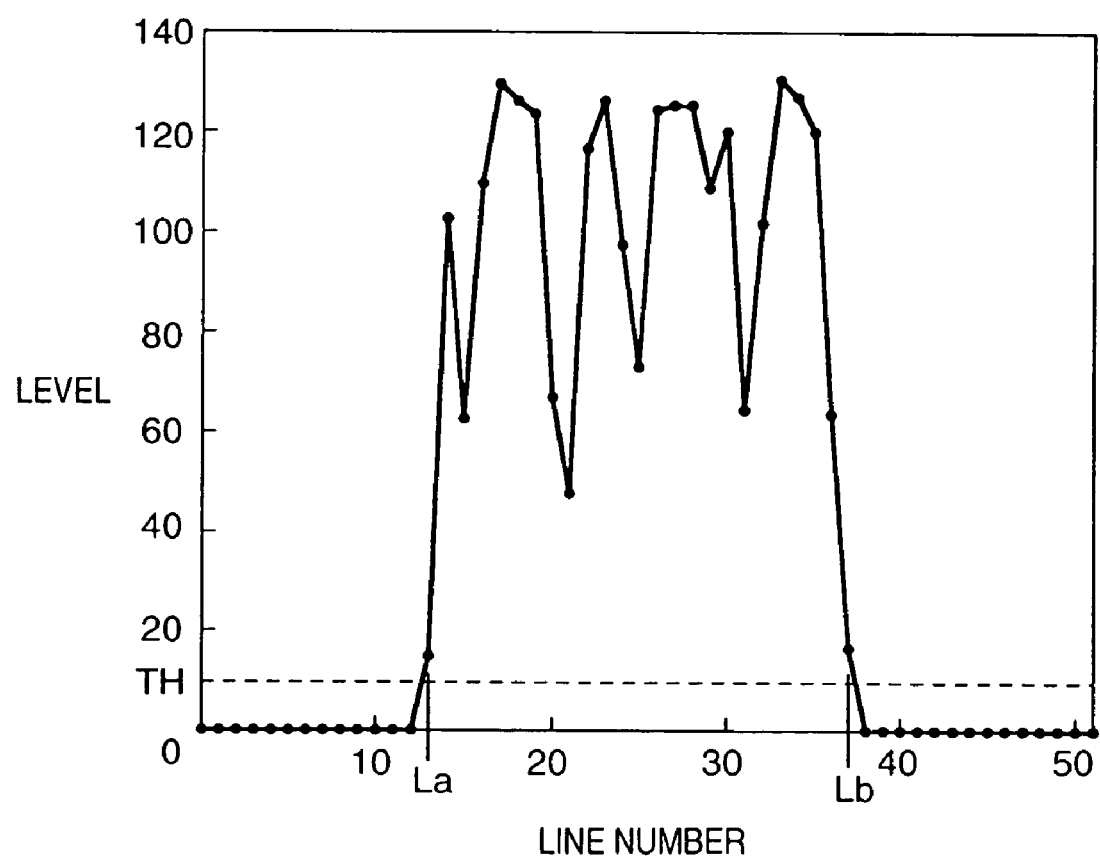
FIG. 6 is a diagram illustrating an example of read data indicative of density unevenness.

FIG. 6 illustrates line average values obtained with regard to the read image data depicted in FIG. 4. As shown in FIG. 6, line numbers are plotted along the horizontal axis and average values along the vertical axis.

Next, on the basis of the average values in the horizontal direction of the read image, the analyzing processing unit 17 detects a line La at which printing of the image starts (step S51). More specifically, it can be determined that printing of the image is to start from a line number at which the line average value first exceeds a certain threshold value TH.

A value of the threshold value TH that makes it possible to distinguish one line from the next correctly and for which the precision of the barycenter is satisfactory is decided by experimentation conducted in advance. If the threshold value is too low, one line cannot be correctly distinguished from the next. If the threshold value is too high, on the other hand, the precision of the barycenter will be too low.

Next, the analyzing processing unit 17 detects a line Lb at which printing of the image ends (step S52). Specifically, as in the detection of the line La at which printing of the image starts, the analyzing processing unit 17 can determine that the printing of the image ends at a line immediately preceding that at which the line average value finally falls below the threshold value TH. Accordingly, in the example of FIG. 6, the determinations made by the analyzing processing unit 17 are La=13, Lb=37.

Next, the analyzing processing unit 17 correlates the line numbers of the read image and the print elements that printed these lines (step S53). As set forth above, the test image is printed by scanning the printhead three times. Accordingly, letting L represent the total number of print elements, a line number L(i) of an image printed by an $i^{th}$ print element in an area that has been recorded by the second scan can be found from the following equation:

$$L(i)=(La+Lb-N)/2+i(i=0, \ldots ,N-1)$$

because (La+Lb)/2 represents a center position printed by the printhead at the time of the second scan and (La+Lb)/2−N/2 represents the position of the $0^{th}$ print element at this time.

Figure 7:
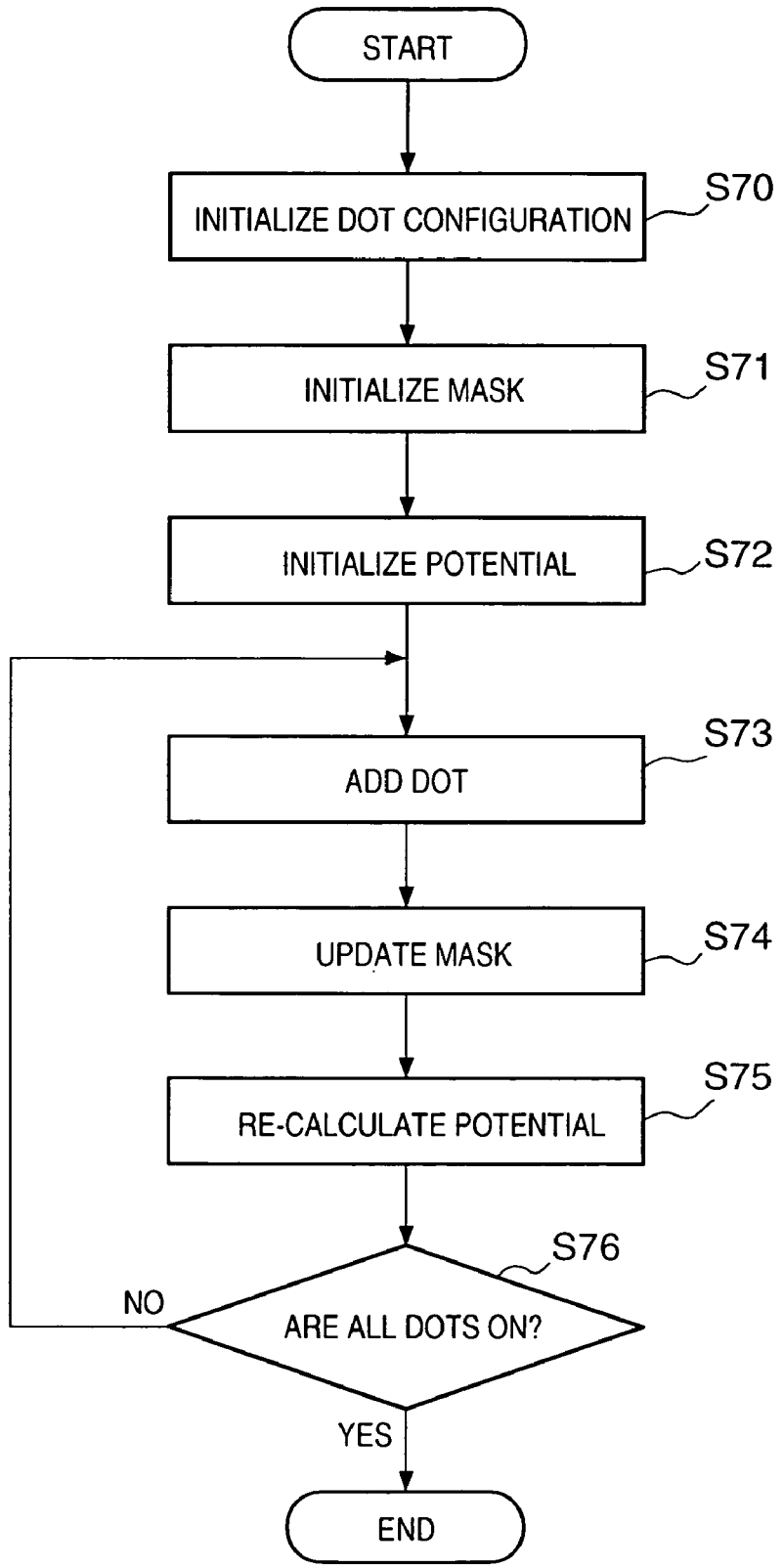
FIG. 7 is a flowchart illustrating the operation of a mask generating processor.

The procedure through which a mask is generated will be described with reference to the flowchart of FIG. 7. In this embodiment, mask size is assumed to be 16 pixels in both the horizontal and vertical directions.

Figure 8:
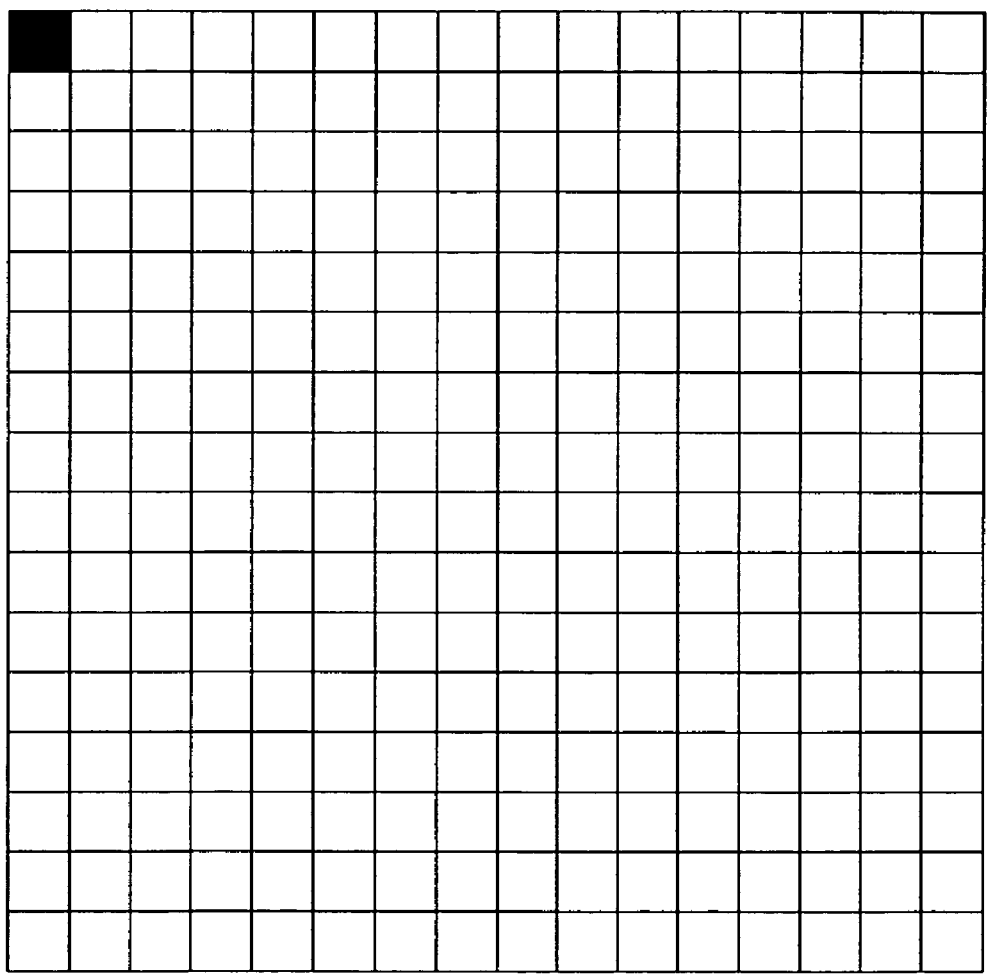
FIG. 8 is a diagram showing the initial state of a dot configuration.

First, the dot configuration of a first level is decided (step S70). Here the first dot is placed at the upper-left corner, as shown in FIG. 8. Next, the mask memory 15 is initialized (step S71). That is, the mask value of the first dot position (0,0) is set to 254 and the other mask values are set to 255. Next, potential is initialized (step S72). It is assumed that the potential is given by the following function f(r) with respect to a distance r from the dot position:

$$f(r)=-0.41r+1.21(r \leq 2)$$

$$f(r)=2.76e^{-r}(2<r \leq 10)$$

$$f(r)=0(r>10)$$

For the dot position (0,0), potential P(x,y) corresponding to a mask position (x,y) is found from the following equation:

$$P(x,y)=A[L(0)] \cdot f(\sqrt{x^2+y^2})$$

Wherein A[L(0)] is an average value of read image at line L(0).

Next, the position of smallest potential is retrieved and a dot is added to this position (step S73). For example, when setting an eleventh dot, the eleventh dot becomes smallest at a position farthest from each of the ten dots that are already set. If there are a plurality of positions having the minimum value of potential, one of these positions is selected at random. Next, the mask values corresponding to the positions of all dots inclusive of the newly added dot are decremented by one (step S74). This is followed by adding in the potential regarding the newly added dot (step S75). If the position of the added dot is (x0,y0), then the new potential is found in accordance with the following equation:

$$P(x,y) \leftarrow P(x,y)+A[L(y0)] \cdot f(\sqrt{(x-x0)^2-(y-y0)^2})$$

Steps S73, S74 and S75 are repeated until dots are added to all pixels' positions of the mask. A threshold-value mask is thus generated.

By thus weighting the potential by the average value of the line, a higher potential is produced for a line having a high average value. The effect of this is that it becomes difficult to add a new dot onto a line having a high average value.

Figure 9:
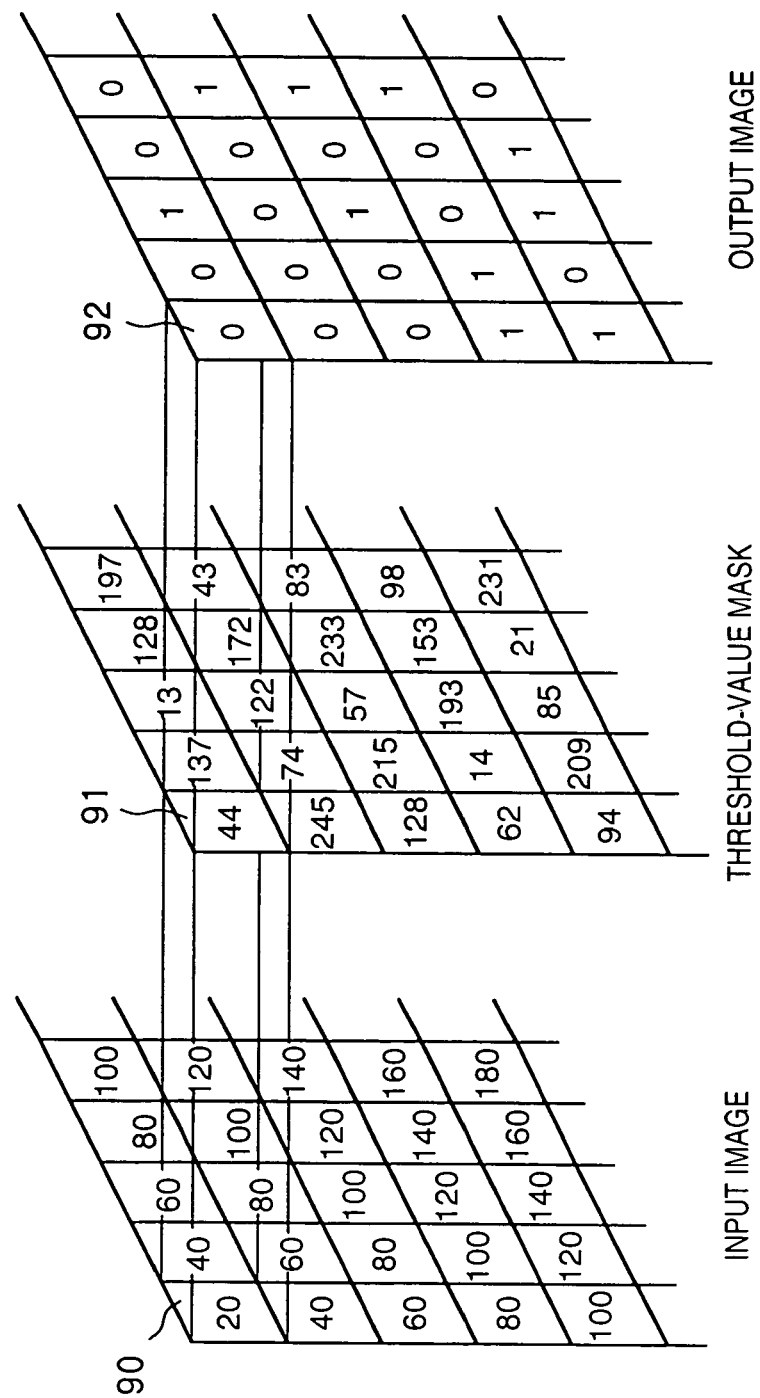
FIG. 9 is a schematic view illustrating the operation of a halftoning processor.

FIG. 9 is a schematic view illustrating a halftoning process. Individual pixels 90 of an input image have the pixel values indicated by the assigned numerals. Individual pixels 91 of a threshold-value mask have the threshold values indicated by the assigned numerals. An output image has individual pixels 92. A numeral 0 indicates that the corresponding pixel is not printed, while a numeral 1 indicates that the corresponding pixel is printed. The halftoning unit compares the content of the image memory and the content of the mask pixel by pixel and, if a pixel value in the image memory is equal to or greater than the corresponding value of the mask, drives the print element to thereby print the relevant pixel.

Thus, in accordance with the first embodiment, it is possible to reduce band-like density unevenness by generating a threshold-value mask that cancels out line-by-line density unevenness ascribable to the characteristics of the printer.

Second Embodiment

The first embodiment corrects for a variation in density for each print element. In a second embodiment, it is possible to correct for printing position deviation for each print element.

The procedure for correcting and outputting an image using the image processing apparatus shown in FIG. 1 will be described again.

Figure 10:
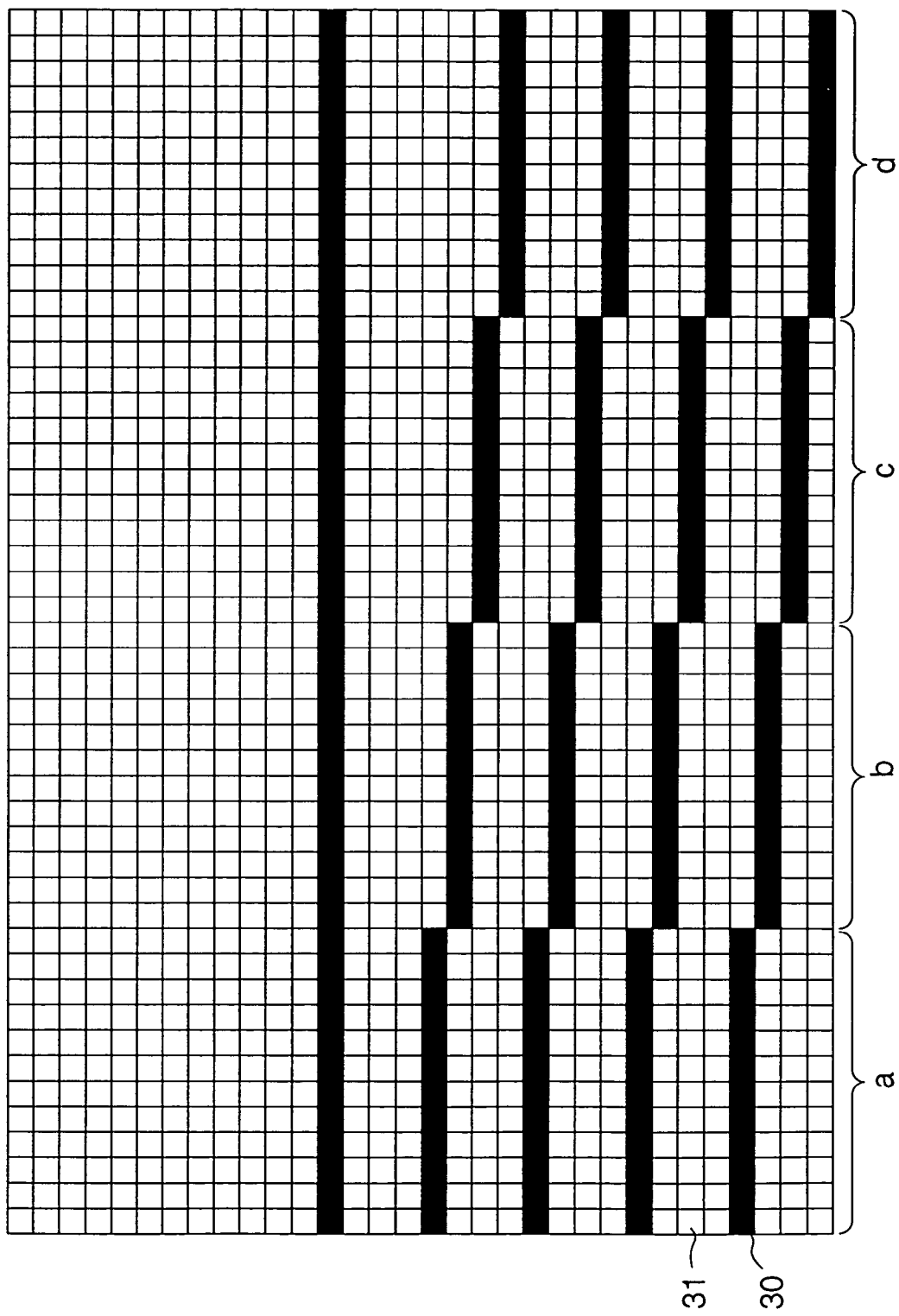
FIG. 10 is a diagram showing an example of a test chart according to a second embodiment of the present invention.

First, a test image is output in order to measure the characteristics of the output device. FIG. 10 illustrates the details of the test image. As in FIG. 3, a white square 30 indicates that the pixel is not printed and a black square 31 indicates that the pixel is printed. As will be apparent from FIG. 10, the test image in this embodiment is composed of blocks a to d having patterns that differ from one another. Further, the size of the test image is 48 pixels horizontally and 32 pixels vertically, and the test image is printed on the print medium by scanning the printhead of FIG. 2 two times.

Figure 11:
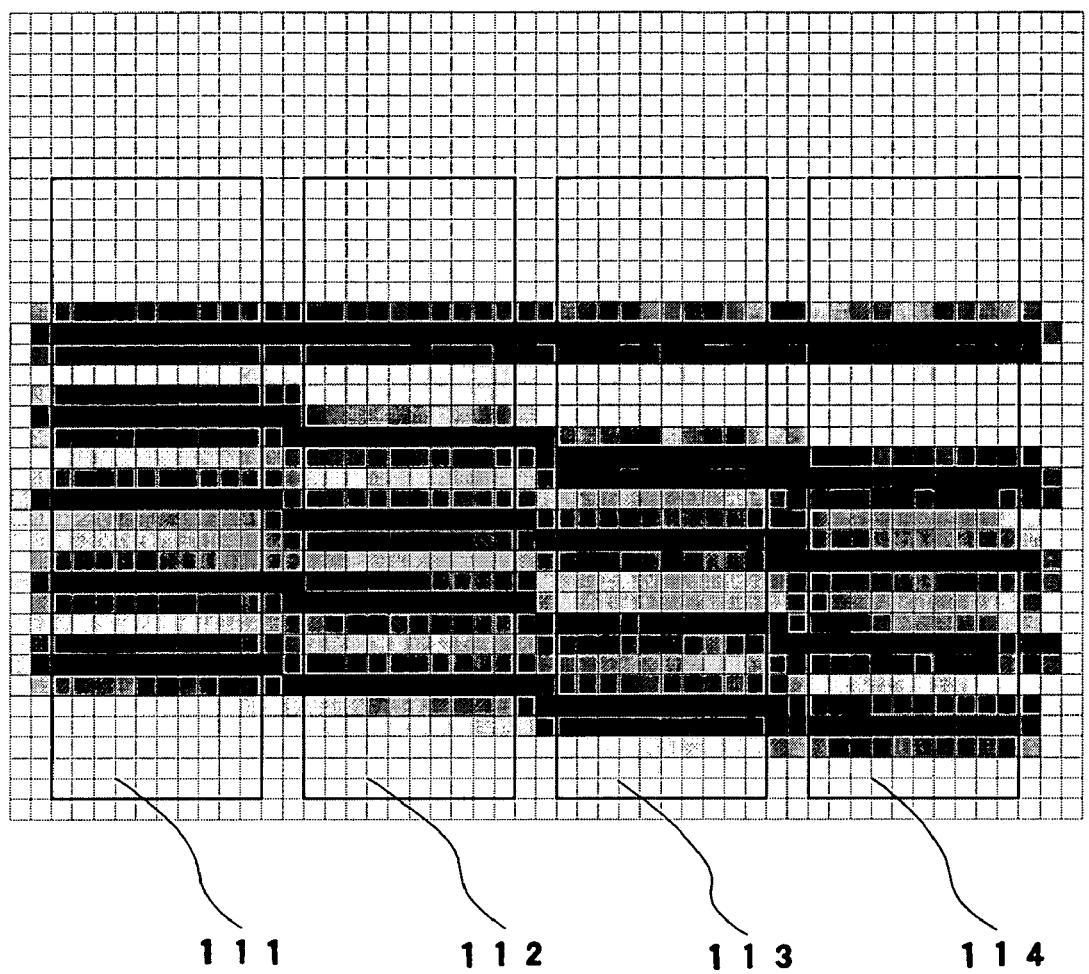
FIG. 11 is a diagram showing an example of reading the test chart according to the second embodiment.

Next, the result of outputting the test image is read by the image reading processing unit 10. In this embodiment, the reading resolution of the image reading processing unit 10 is assumed to be the same as the output resolution of the printer 13 and it is assumed that 256 levels can be read for each pixel. FIG. 11 illustrates an example of the image read by the image reading processing unit 10.

Figure 12:
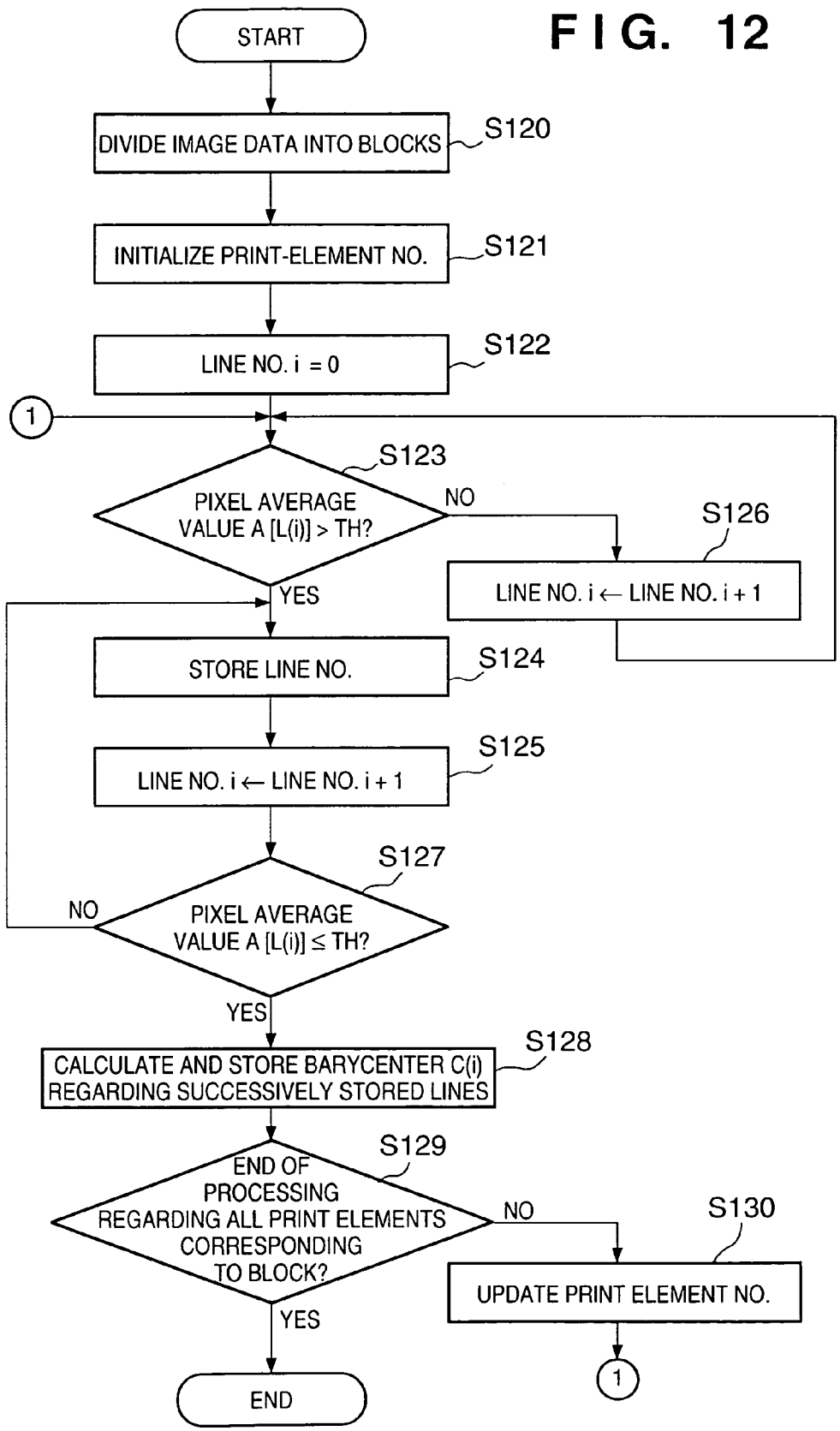
FIG. 12 is a flowchart illustrating the operation of an analyzing processor according to the second embodiment.

Next, the output characteristic of each print element is analyzed by the analyzing processing unit 17. FIG. 12 is a flowchart illustrating processing executed by the analyzing processing unit 17.

As shown in FIG. 12, the analyzing processing unit 17 first divides the read image data into four blocks 111, 112, 113, 114 corresponding to the blocks a, b, c, d of the test image (step S120). When the read image data is divided into these blocks, a space which takes into account a deviation in position at reading time is provided between neighboring blocks and each block is set to have a width sufficient for calculation of an average value.

Next, the analyzing processing unit 17 initializes the print-element numbers of each block (step S121). In the test image of this embodiment, print elements 12, 0, 4, 8, 12 in block a, print elements 12, 1, 5, 9, 13 in block b, print elements 12, 2, 6, 10, 14 in block c and print elements 12, 3, 7, 11, 15 in block d are printed. The blocks 111 to 114 in FIG. 11 correspond to the blocks a to d, respectively, in FIG. 10.

Figure 13:
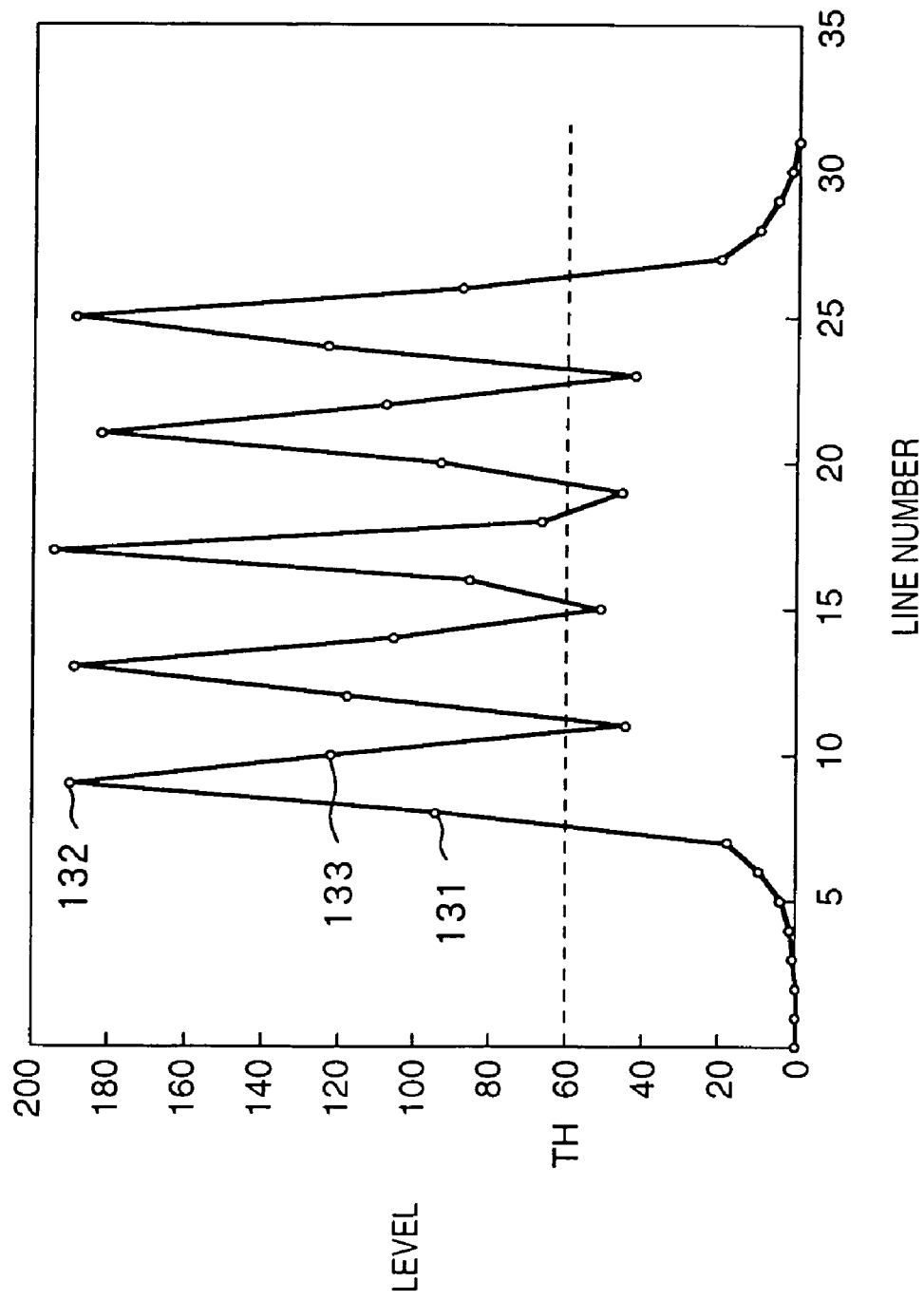
FIG. 13 is a diagram showing an example of read data indicative of a deviation in position.

Reference will be had to FIG. 13 to describe processing regarding block 111, which is regarded as being representative of all of the blocks 111 to 114.

First, the analyzing processing unit 17 finds the line number at which the average value of the pixels on the line is greater than a threshold value TH (step 123) and stores this line number (step S124). If the average value of pixels on a line does not exceed the threshold value TH, the analyzing processing unit 17 increments the line number (step S126) and evaluates the next line.

At steps S125 and S127, the analyzing processing unit 17 determines whether the average pixel value of the next line exceeds the threshold value TH and successively stores the line numbers for which the average pixel value continually exceeds the threshold value TH.

If a line for which the average pixel value is equal to or less than the threshold value TH is found at step S127 ("YES" at step S127), then the analyzing processing unit 17 calculates the barycenter C with regard to the line, the line number of which was stored at step S124, for which the average pixel value continually exceeds the threshold value TH, and stores the barycenter (step 128). The barycenter C is found in accordance with the following equation:

$$C = \sum_{y=0}^{H-1} y \cdot A(y) \bigg/ \sum_{y=0}^{H-1} A(y)$$

where A(y) represents the average pixel value of line y and H represents the number of lines for which the threshold value is exceeded.

FIG. 13 is a graph of the average pixel values of lines in block 111. As shown in FIG. 13, line numbers are plotted along the horizontal axis and average values of pixels along the vertical axis. In this case, lines on which the print element 12 prints the first time correspond to the three lines 131, 132, 133 for which the threshold value TH is exceeded, and the position of the barycenter of these three average values is calculated. The position of the barycenter corresponding to the initial print element represents a reference position and is denoted by C0. In FIG. 13, the separation between lines is inadequate at TH=50 and the precision of the barycenter is too low at TH= 100. Accordingly, the threshold value TH is set to 60.

Next, the analyzing processing unit 17 determines whether the barycenter calculation processing is finished for all print elements corresponding to the block (step S129). If processing is not finished ("NO" at step S129), the analyzing processing unit 17 updates the number of the print element (in the manner 12→0→4→8→12 in the case of block 111) (step S130) and then repeats the above-described processing from step S123 onward, thereby obtaining the barycentric position of each print element.

The foregoing processing is applied to the remaining blocks 112 to 114 and a relative value C(i) from the reference position C0 of the barycentric position of each print element i, namely C(i)–C0, is delivered to the mask generator.

(Mask Generation Processing)

The procedure for generating a mask will be described with reference to FIG. 7. The size of the mask is assumed to be 16 pixels in both the horizontal and vertical directions.

First, the dot configuration of a first level is decided (step S70). Here the first dot is placed at the upper-left corner, as shown in FIG. 8. Next, the mask memory 15 is initialized (step S71). That is, the mask value of the first dot position (0,0) is set to 254 and the other mask values are set to 255. Next, potential is initialized (step S72). It is assumed that the potential is given by the following function f(r) with respect to a distance r from the dot position:

$f(r)=-0.41r+1.21 (r \leq 2)$ $f(r)=2.76e^{-r} (2<r \leq 10)$ $f(r)=0 (r>10)$

For the dot position (0,0), potential P(x,y) corresponding to a mask position (x,y) is found from the following equation:

$P(x,y)=f[\sqrt{x^2+c(y)^2}]$

Next, the position of smallest potential is retrieved and a dot is added to this position (step S73). If there are a plurality of positions having the minimum value of potential, one of these positions is selected at random. Next, the mask values corresponding to the positions of all dots inclusive of the newly added dot are decremented by one (step S74). This is followed by adding in the potential regarding the newly added dot (step S75). If the position of the added dot is (x0,y0), then the new potential is found in accordance with the following equation:

$P(x,y) \leftarrow P(x,y)+A[L(y0)] \cdot f(\sqrt{(x-x0)^2+[y-c(y0)]^2})$

Steps S73, S74 and S75 are repeated until dots are added to all pixels' positions of the mask. A threshold-value mask is thus generated.

By thus correcting the potential by the amount of deviation of the line, potential is reduced where the spacing between lines is large. The effect of this is that it becomes easier for dots to be added on.

Halftoning processing can be executed in a manner similar to that of the first embodiment.

Thus, in accordance with the second embodiment as described above, it is possible to reduce stripes by generating a threshold-value mask that cancels out line-by-line density position deviation due to the characteristics of the printer.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiment.

In a case where the present invention is applied to the above-mentioned storage medium, program code corresponding to flowcharts (any one or more of the flowcharts shown in FIGS. 5, 7 and 12) described earlier would be stored on this storage medium.

Thus, in accordance with the present invention, as described above, a threshold-value mask is generated so as to cancel out band-like density unevenness produced by an image forming apparatus. As a result, it is possible to reduce output unevenness without losing image data. In addition, processing can be executed at high speed by executing mask-based halftoning.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for supplying an image forming apparatus having a plurality of print elements with image data that has undergone a halftoning process by using a threshold mask which is corrected based on an output characteristic of the image forming apparatus, comprising:
   output characteristic analyzing means for analyzing the output characteristic based on line-by-line density output by each of the plurality of print elements of the image forming apparatus;
   mask generating means for generating the threshold mask, which is used in the halftoning process, by correcting a threshold mask based upon the output characteristic analyzed; and
   supplying means for subjecting image data output to the image forming apparatus to the halftoning process using the generated threshold mask, and supplying the image forming apparatus with the image data after the halftoning process thereof,
   wherein the mask generating means generates the threshold mask by using potential weighted by the output characteristic analyzed by the output characteristic analyzing means.

2. The apparatus according to claim 1, wherein the output characteristic is a line-by-line average density output by each of the plurality of print elements of the image forming apparatus.

3. The apparatus according to claim 1, wherein the output characteristic is a barycenter of lines, output by each of the plurality of print elements, whose average densities exceed a predetermined value.

4. The apparatus according to claim 1, wherein said output characteristic analyzing means includes:
   image reading means for reading results output by the image forming apparatus; and
   density detection means for detecting line-by-line average density from results output by said image reading means.

5. An image forming system comprising the image processing apparatus set forth in claim 1, and an image forming apparatus.

6. A computer readable medium storing a program capable of being executed by a computer, wherein the computer which executes said program is made to function as the image processing apparatus set forth in claim 1.

7. An image processing method for supplying an image forming apparatus having a plurality of print elements with image data that has undergone a halftoning process by using a threshold mask which is corrected based on an output characteristic of the image forming apparatus, comprising:
   an output characteristic analyzing step of analyzing the output characteristic based on line-by-line density output by each of the plurality of print elements of the image forming apparatus;
   a mask generating step of generating the threshold mask, which is used in the halftoning process, by correcting a threshold mask based upon the output characteristic analyzed; and
   a supplying step of subjecting image data output to the image forming apparatus to the halftoning process using the generated threshold mask, and supplying the image forming apparatus with the image data after the halftoning process thereof,
   wherein the mask generating step generates the threshold mask by using potential weighted by the output characteristic analyzed by the output characteristic analyzing step.

8. The method according to claim 7, wherein the output characteristic is line-by line average density output by each of the plurality of the print elements of the image forming apparatus.

9. The method according to claim 7, wherein the output characteristic is a barycenter of lines, output by each of the plurality of print elements, whose average densities exceed a predetermined value.

10. The method according to claim 7, wherein said output characteristic analyzing step includes:
    an image reading step of reading results output by the image forming apparatus; and
    a density detection step of detecting line-by-line average density from results output by said image reading means.

11. A computer readable medium storing the image forming method, which is set forth in claim 7, as a program capable of being executed by a computer.

* * * * *

UNITED STATES PATENT AND TRADEMARK OFFICE
CERTIFICATE OF CORRECTION

PATENT NO. : 6,970,270 B1 Page 1 of 1
DATED : November 29, 2005
INVENTOR(S) : Atsushi Ushiroda It is certified that error appears in the above-identified patent and that said Letters Patent is hereby corrected as shown below:

Column 1,
Line 59, "performed" should read -- performed with a --.

Column 2,
Line 16, "performed" should read -- performed with a --.

Column 3,
Line 33, "as" should read -- an --.

Column 5,
Line 45, "are" should read -- is --.

Column 7,
Line 14, delete "of".

Column 8,
Line 12, "are" should read -- is --.

Signed and Sealed this

Twenty-third Day of May, 2006

JON W. DUDAS
*Director of the United States Patent and Trademark Office*